Feb. 18, 1964
A. C. PETERSON
3,121,414
CONVERTIBLE PROPULSION SYSTEM
Filed April 17, 1961
4 Sheets-Sheet 4
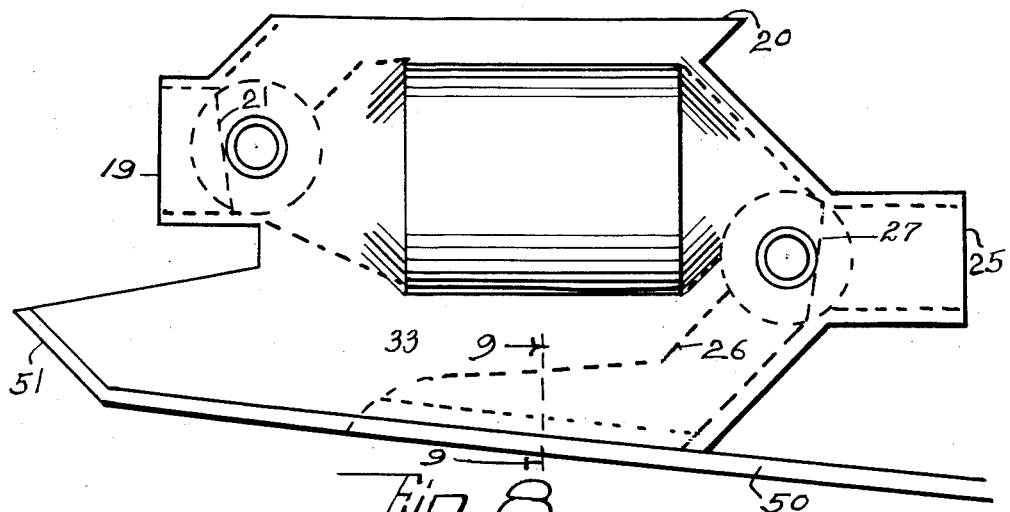
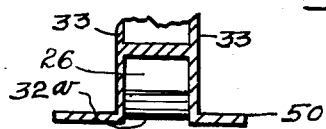
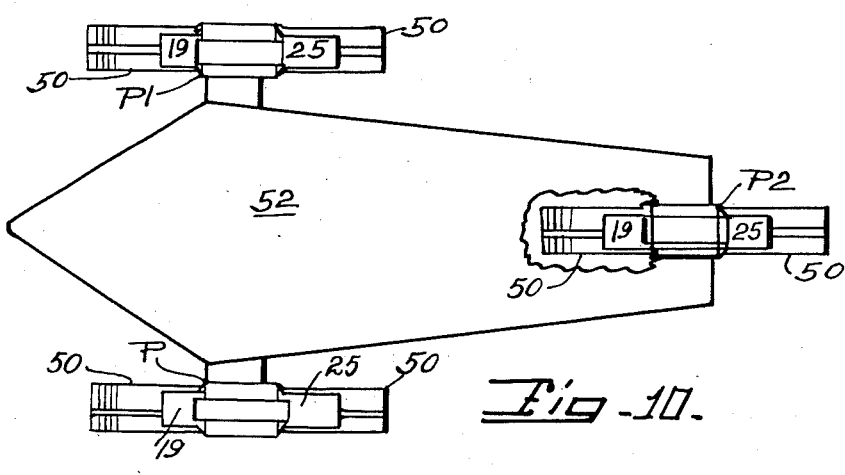
INVENTOR.
*Adolphe Peterson.*

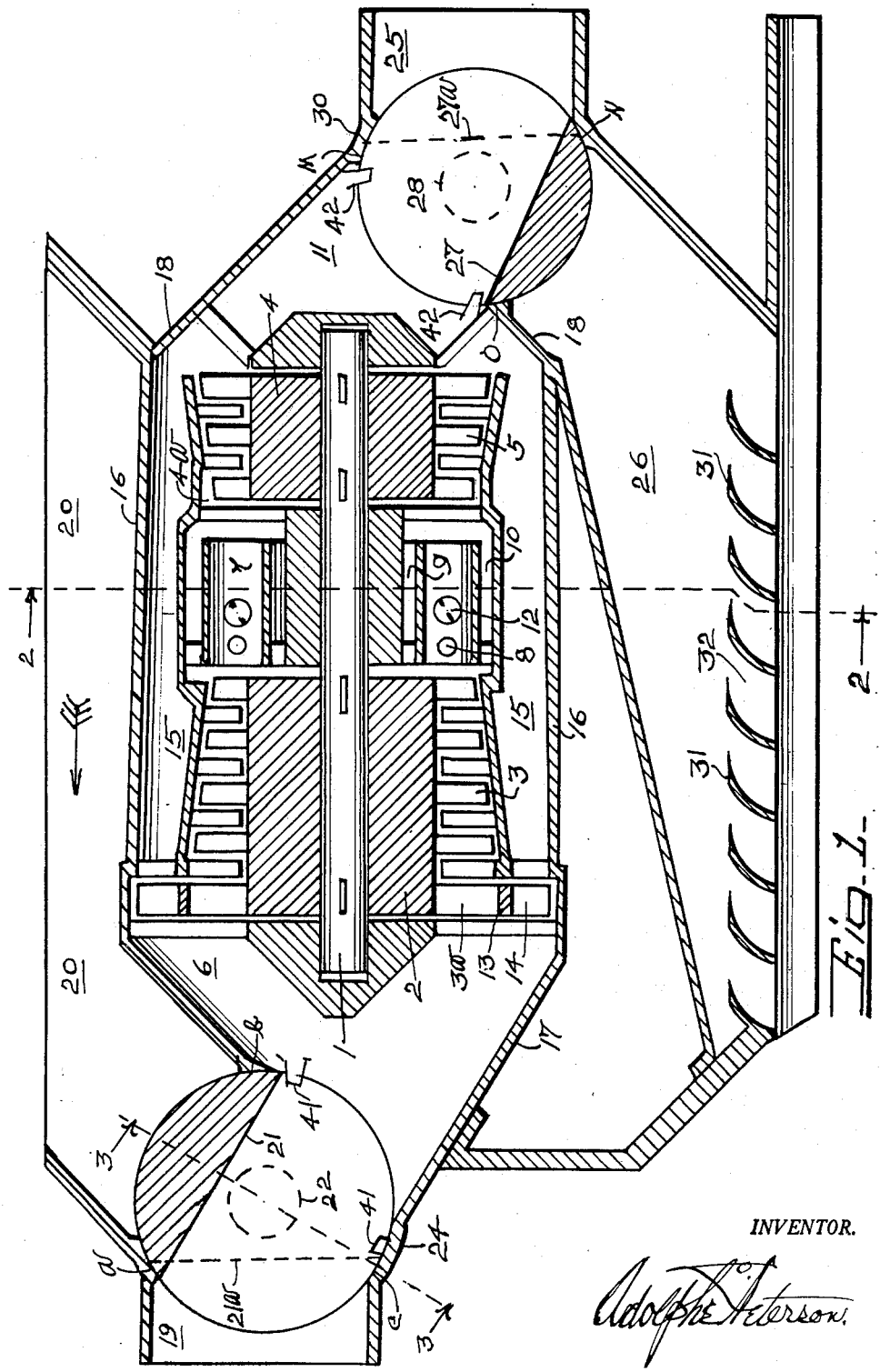

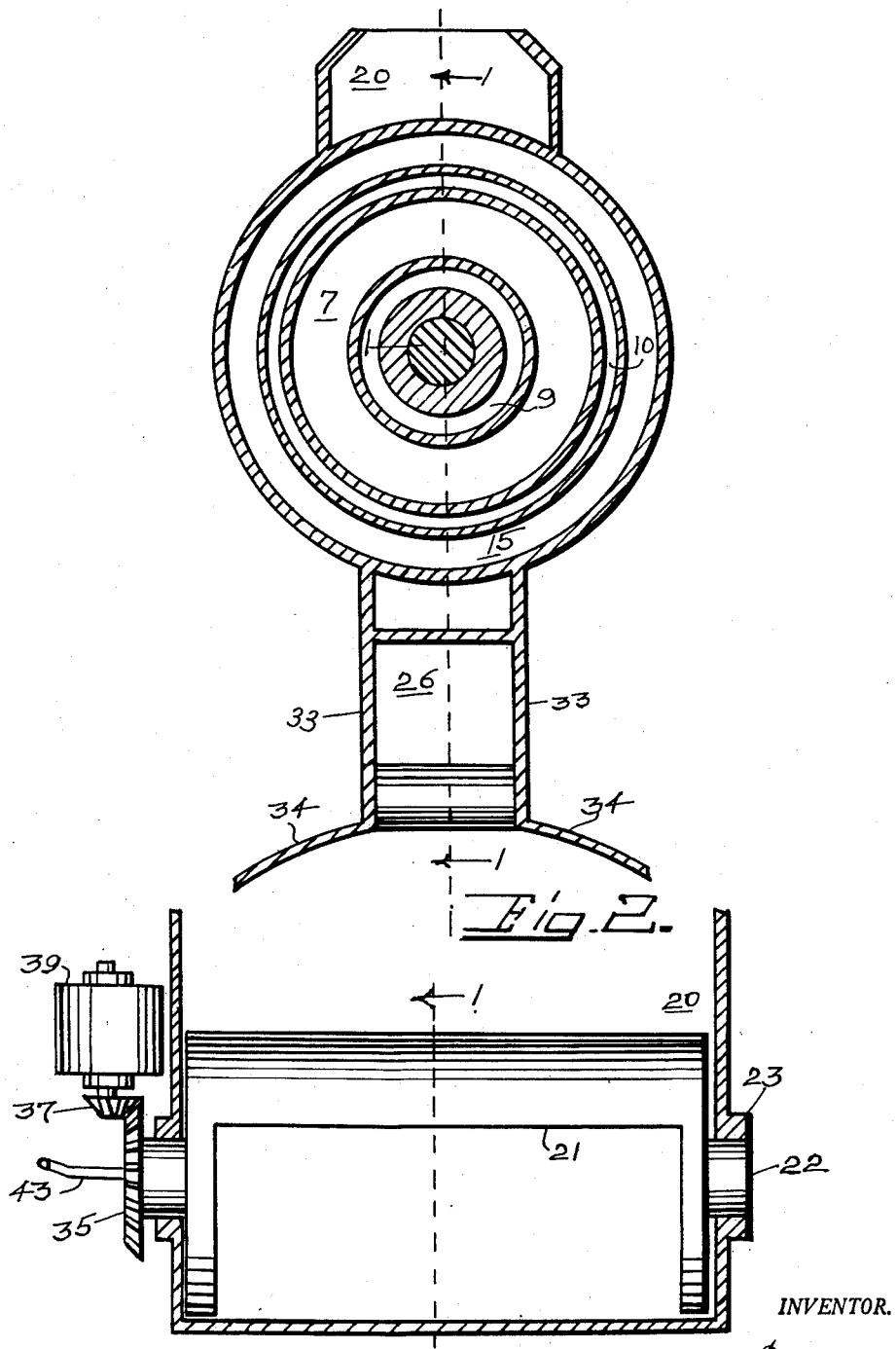

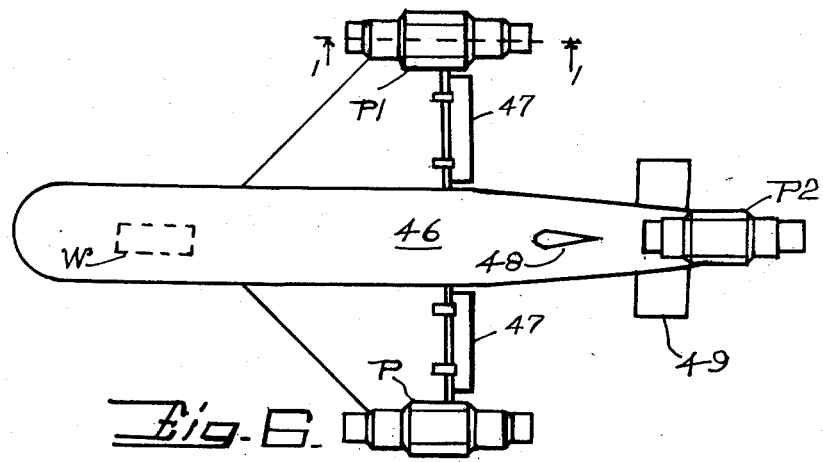
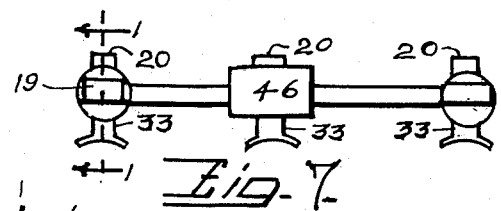
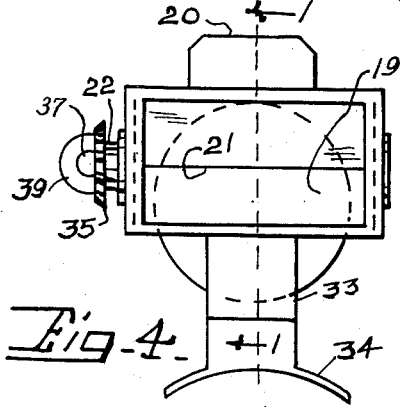
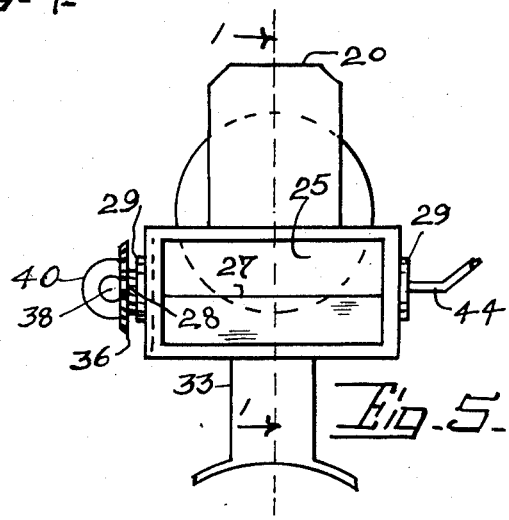
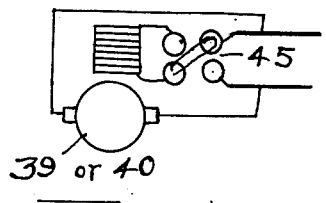

United States Patent Office 3,121,414
Patented Feb. 18, 1964

3,121,414
CONVERTIBLE PROPULSION SYSTEM
Adolphe C. Peterson, Minneapolis, Minn.
(4623 Bruce Ave. S., Edina, Minn.)
Filed Apr. 17, 1961, Ser. No. 103,958
12 Claims. (Cl. 114—66.5)

My invention relates to propulsion engines and especially to a system of propulsion which is capable of two different uses and it is therefore called convertible propulsion system.

The chief objects of my invention are to provide a propulsion engine or means which may be used to provide propulsion for various uses in an air craft and also in water borne craft and which is relatively simple in view of the objects accomplished and which because of such relative simplicity for various uses can provide an effective means for the purposes thereof without such great cost as will generally accompany propulsion means for such purposes. The chief objective in this invention is to provide a propulsion engine which can in use readily be converted to such operation that in one use it will effectively propel an aircraft or a water vehicle in forward horizontal travel and so that in the other of its uses it can provide vertical take-off or sustentation capacity so that it can therefore provide the upward propulsion which will for an aircraft enable it to take off from land or water without any, or a minimum of, forward travel before such take-off, and which will for a water borne craft provide that upward lift which will enable the craft to speedily accomplish the lift on planing elements such as water skiis so that the speed for travel on such planing elements is quickly secured. The invention is especially designed for use with aircraft but may have the use indicated for water borne craft. Means which have been devised for use of turbines for vertical take off are of complicated form and such as are not readily incorporated in an aircraft without weakening of the structure of the aircraft and it is one object to provide a means for similar purpose without complication and form which may result in such weakness of the aircraft structure. Another incidental use and objective is provision of means which may be used for braking of aircraft in landing of the aircraft. In general the object is improvement and betterment of the form and use of aircraft propulsion means and also of water borne craft.

The principal devices and combinations of devices which comprise my invention are as hereinafter described and as defined in the claims. In the accompanying drawings which illustrate my invention in several different forms, like characters refer to like parts throughout the several views. Referring to the drawings:

FIGURES 1, 2, 3, 4, 5, illustrate the propulsion unit and of these figures: FIGURE 1 is a view in vertical section on a plane passing vertically through the axis of the principal operating elements of the device, some parts being in full side elevation, some minor parts being diagrammatically illustrated, this view being in section on the lines 1—1 of FIGURES 2, 3, 4, 5; FIGURE 2 is a section on the line 2—2 of FIGURE 1 one part being shown in vertical elevation; FIGURE 3 is a view in angled section on the line 3—3 of FIGURE 1 and showing a valve and some of its operating means in elevation from leftwardly of FIGURE 1; FIGURE 4 is a view on one-half the scale of FIGURE 1 this being a front view or view from leftwardly of FIGURE 1; FIGURE 5 is a view on one-half the scale of FIGURE 1 this being a rear view from rightwardly of FIGURE 1.

FIGURES 6 and 7 are views on a very much smaller scale to show an aircraft to which three of my units as illustrated in FIGURES 1, 2, 3, 4, 5, are applied, FIGURE 6 being a plan view, FIGURE 7 being a front view from leftwardly of FIGURE 6.

FIGURES 8, 9, 10 are views of the modified form showing the use of the device on a water borne craft, and the slightly modified form of the unit as used in this application: FIGURE 8 being a side elevation of a propulsion unit on a scale about one-half that of FIGURE 1; FIGURE 9 being a detail section on the line 9—9 of FIGURE 8, FIGURE 10 being a plan view of a water borne craft to which three of the units illustrated in FIGURE 8 (and as in the first form) are applied. FIGURE 11 is a diagrammatic circuit as used with control motors.

Referring first to the figures from 1 to 5, inclusive, the chief operating elements include a rotor shaft 1, an air compressor rotor 2 having compressor blades 3, a turbine rotor 4 having turbine blades 5, and these elements rotate as a unit to inspirate air from an air intake chamber 6 and they compress the air and pass it to an annular combustion chamber 7 where the air is combusted with fuel from fuel nozzle means 8, and the combustion products are mixed with more compressed air passing through annular channels 9 and 10 and the mixture is passed through annular channel 4a about the turbine rotor driving the latter and the mixture is discharged to the gas discharge chamber 11. A spark plug 12 provides ignition for the combustion gases. These elements as described are generally as such elements are formed and generally used in combustion turbines. The annular stage of compressor blades which is designated 3a have affixed to their annular periphery the annular ring 13 and that ring bears affixed to it the air fan blades 14 which blades provide for the forced movement of atmospheric air from the air intake chamber 6 through the annular supplemental channel 15 and that air also passes to the gas discharge chamber 11. There is an annular wall 16 formed to be about the annular supplemental channel 15, the latter wall being extended at its forward and rearward ends to form the cone shaped walls 17 and 18 respectively which are about the air intake chamber and the gas discharge chamber respectively.

The air intake chamber 6 may receive atmospheric air or ambient air by means of either the normal propulsion inlet 19 or the sustentation propulsion inlet 20, the former receiving air from ambient air when the unit is moving forwardly in travel, and the latter receiving air from ambient air when the unit is arranged for drawing air from above the unit (or aircraft), that is when the unit is arranged for use as sustentation means for full or supplemental sustentation when the aircraft (or other device) is in a landing process (or settling) or a take-off or planing initiation movement. The control of the inlets and their connection with the air intake chamber 6 is provided by a generally cylindrical shaped rotary valve 21 which is rotatable on its axially disposed shaft 22 in the latter's bearings 23 and within a generally cylindrical chamber 24, the latter providing closure for the valve at only three short sectors $a$, $b$, and $c$, so that in one position of the valve, that which is shown in FIGURE 1, free and full communication of the air inlet 19 with the air intake chamber 6 is provided, and so that in the alternative position which is diagrammatically shown by the dotted line 21a, there is full and free communication of the sustentation propulsion inlet (air inlet) 20 with the air intake chamber 6. The inlet 20 is relatively long in proportion to its width transversely of the direction of aircraft flight and this inlet is directed vertically upwardly so that air entering is under suction from the air compressing rotor means which has been described when the rotary valve 21 is placed to permit that suction.

The gas discharge chamber 11 may discharge gaseous products and air by either the normal propulsion discharge jet 25 or the sustentation propulsion channel 26, the latter discharging gases to ambient air below the aircraft when the unit is not propelling forwardly in travel but is arranged for sustentation chiefly or fully, and the former discharging gases to ambient air rearwardly of the aircraft when the unit is arranged for normal propulsion chiefly or fully. The control of this discharge means is provided by a generally cylindrically shaped rotary valve 27 which is rotatable on its axially disposed shaft 28 in the latter's bearings 29 and within a generally cylindrical chamber 30, the latter providing closure for the valve at only three short sectors m, n, o, so that in one position of the valve, that which is shown in FIGURE 1, free and full communication of the gas discharge jet 25 with the gas discharge chamber 11 is provided, and so that in the alternative position, which is diagrammatically shown by the dotted line 27a, there is full and free communication of the gas discharge chamber 11 with the sustentation propulsion channel 26.

The sustentation propulsion channel 26 is generally directed in the opposite direction to the movement of gases through the turbine and the gases flowing through the channel 26 flow by way of directing vanes or blades 31 through the intermediate spaces 32 so that the gases are directed vertically downwardly as they emerge from the channel 26 and in the direction change will also exert some upward lifting force on the under side of the vanes 31, so that by such gas discharge through channel 26 there are these two sustentation exerting forces effected, the upward lift by vanes 31 and the upward lift provided by the reaction upwardly exerted by the reactive force of the issuing discharge gases on the surfaces above the gas discharge. It will be seen that there is some backward force exerted by gases discharging through channel 26 and that this is in part counteracted by the vanes 31. It should be mentioned here that the backward force which may be a retarding force in braking of such a vehicle as an aircraft may be increased to be proportionately larger by elimination of the vanes or blades 31 from the discharge end of the channel 26. Whether these vanes 31 are or are not used in any particular construction will depend on the function which is especially or chiefly desired in the particular construction.

The channel 26 is formed in or between vertical walls 33 which are spaced apart a proportionately short distance so that a channel (26) is formed to be relatively long in the direction of normal forward travel and to be relatively narrow transversely of the direction of such travel. At the lower ends of the walls 33 there are formed relatively long and narrow slightly curved projection walls 34, one on each side of the channel 26, these being substantially horizontal or parallel to direction of flight or travel, although they may be formed to be at an angle, as is described in connection with FIGURE 8.

The rotary valves 21 and 27 have respectively bevel gears 35 and 36 fixed thereon and these are inter-geared with small bevel gears 37 and 38, respectively, and the small bevel gears are fixed, respectively, on the shafts of electric motors 39 and 40, these providing for actuation independently of the valves 21 and 27, so that these valves are each independently under the control of the pilot or operator of the aircraft (or water borne craft). It is contemplated that there will be such large reduction provided by the gear reduction means, that a relatively small motor may provide for the control of the valve. To that end the gear reduction means may be of any type as commonly provided in control means, such as a multiple gear reduction, a worm and wheel reduction, or otherwise. The valve 21 is stopped at either extreme of its rotation (or oscillation) by means of a pair of stops 41 affixed to the casing walls, as for valve 21, and the valve 27 is stopped at either extreme of its rotation (oscillation) by means of a pair of stops 42 affixed to the casing walls. The valves may be arranged to be stopped at any point of their oscillations, by any means provided for that control. The valve 21 is shown to be provided with a flexible shaft extending from its shaft, this flexible shaft providing for control or movement of any indicating means which may be used to inform the pilot of the position of the valve. A similar flexible shaft is provided for the valve 27 (see FIGURE 5). The former flexible shaft is designated 43 and the latter 44. As shown in FIGURE 11, there is a reversing circuit changing means provided by switch means 45, this reversing means being provided for each motor driving the valves 21 and 27, this reversing means providing for change to the alternative positions of the valves.

Referring now to FIGURES 6 and 7, these figures show three units such as have been described, and as are applied to an aircraft having a fuselage 46, wing flaps or ailerons 47, rudder means 48 and vertical rudder means 49. The rudder means is provided as they may be supplemental control means, although it is contemplated that the propulsion units may be used for such control also. In some constructions the propulsion units and their valve means may provide the sole elevational and horizontal directional control, the rudder means 48 and 49 being then eliminated, but they are preferably provided also. The flaps or ailerons 47 are preferably provided to supplement the sustentation control provided by the valve change means and the vertical downward flow of gas discharge. The fuselage may be provided with land wheels as is customary in aircraft and these are not shown as their use is customary. But they may in some constructions be omitted and the aircraft may then be proportioned so that there is the full upward sustentation provided by the propulsion units as may be necessary. Fuselage 46 may have landing wheels W.

In the use of the aircraft with the propulsion units as described and as applied to the aircraft, FIGURES 6 and 7, the aircraft is provided with the necessary fuel supply and fuel supply means by means of the nozzle means, as stated, such fuel means being of any type as commonly used in connection with turbines, and being therefore only diagrammatically shown. Assuming that the aircraft is resting on land or an airport, and it is desired to take-off, the fuel supply to each of the turbine units is initiated by any means as provided, and the pilot will then by means of the electric motors of each propulsion unit, station the valves 21 and 27 of each unit so that the units will all function for the sustentation flow of gases, that is so that air will be under suction from upwardly of the units and so that gas discharge will be through the channels 26 of the units. Under that condition, each unit will induct air from vertically upwardly and will discharge gases through the channels 26 of the units and as directed by the vanes 31 of units and the discharges will then be vertically downwardly, and there will be vertical sustentation and lift upwardly by three forces, the force of downward suction from above, the force of downward discharge ejection of gas, and the force of directional change of flow by means of the vanes 31.

When the fuel flow to the turbines is increased to its full flow or near that flow, the flow of gases to the channels 26 and vanes 31 and the thrust downwardly of the gases will by their reaction cause such an upward lift on the aircraft that it is lifted from the ground or landing place and when so lifted upwardly the pilot may gradually cause the valves 21 and 27 to be partially turned that is to cause some ejection of gases rearwardly of the aircraft and some suction from forwardly of the aircraft and the aircraft will then start to move forwardly and gain in speed, and as there is such gain in speed the pilot may further turn the valves toward their positions for normal flight. As a normal flight is approached or reached, the pilot may cause the valves 21 and 27 to complete their movement to the full forward flight positions which positions are those as shown by the full lines in FIGURE 1, and thereupon there is no ejection of gases through channels 26 but only by way of the forward jet propulsion discharge and full normal flight speed may then be obtained. As the aircraft is conditioned for the normal flight the flaps or ailerons 47 may be used to assist in sustentation, and the aircraft's wings will also assist in that sustentation.

If the aircraft is provided with landing wheel means as aircraft normally are, then the take-off from ground may be accomplished in part by the upward lift of the movement of gases from channels 26 and vanes 31, downwardly, and in part by the sustentation action of the aircraft's wings and the flaps 47, thereby lessening the proportion of upward lift which must be provided by the downward thrust of gases. It is contemplated that either method may be adopted in an aircraft construction.

When the pilot desires to return to the ground, he moves the valves 21 and 27 to the positions for upward sustentation thrust of gases, and as he approaches the ground he also moves the flaps 47 to the positions for assisting in sustentation, by such means as normally provided in aircraft for that purpose, and the aircraft will then settle to the ground. In take-off and landing operation and hovering of the aircraft, the pilot may use the valves of the propulsion unit located at the rear end of the fuselage to provide such balancing force by the jet discharge, as is found necessary, but it may be noted, that if the aircraft is provided with ground or landing wheels, as is commonly done, he may also use the ailerons 47 and rudder means, as is necessary for that purpose. In the case where the aircraft landing wheels are used, a landing strip may be relatively short, as upward lift is quickly attained.

Referring now to the modified form which is illustrated in FIGURES 8, 9, 10, this form is, insofar as the operative elements of the combustion means, turbine means, valves 21 and 27, and channels 26, are concerned, similar to the similar means of the first form described, and further description thereof is therefore not now necessary. The chief and only difference, as shown, is that the channel 26 ejects the gases from the jet discharge 32a which is located in a section of a hydrofoil 50 which is at its front end 51 upwardly inclined, sharply, and which is in the balance of the hydrofoil, that is rearwardly thereof, inclined at a small angle to the normal horizontal travel of the hydrofoil craft or boat 52. This angle to the horizontal may be any such angle as fifteen to thirty or even forty degrees as is found most suitable and as is generally adopted for hydrofoils in use for hydrofoil craft so that the craft will in normal high speed travel be lifted by the hydrofoils and caused to ride on the relative surface or near the surface of the water on which the boat or craft will travel. In use of the gas flow means, the valves 21—27 are caused to move to the positions for the downward discharge ejection (shown by dotted lines 21a—27a) and thereupon the gases ejecting downwardly will cause such upward lift on the craft that it is lifted quickly to the position at which it will ride relatively on the surface of the water, and thereupon the pilot moves the valves 21—27 to the positions for horizontal intake of air and horizontal discharge of gases rearwardly as in jet propulsion means, and the craft then attains the speed at which it will ride on the hydrofoils of the three propulsion units designated P1, P2, P3, and there is then no ejection of gases by channels 26 and discharges 32a. In this use, for water borne craft, the vanes 31 may or may not be used in any construction, as may be desired, and as may be found to be most helpful in the operation of the craft.

The valves 21 and 27 may be used in the manner indicated above to assist in the conversion of the propulsion units, as described, but it may be noted that there may also be provided in an aircraft any other type of forward propulsion engine, such as rocket propulsion units or other turbine units, to assist in the conversion of the flight system. It is especially to be noted that the control and actuating means for the valves 21 and 27 may be of any type which will adequately accomplish that function and that the valves may have other form while yet accomplishing the function thereof.

While I have shown particular devices and combinations of devices in the illustration of my invention, I contemplate and intend that other detailed devices and combinations of devices may be utilized in the realization of my invention without departing from the scope and comprehension of my invention.

What I claim is:

1. A turbine propulsion means comprising: a rotary air compressor, a combustion chamber receiving air under pressure from the compressor, a fuel supply to the combustion chamber, a turbine receiving gaseous products and air from the compressor and combustion chamber, the turbine driving the air compressor; a primary air intake directed forwardly and in the direction of normal travel propulsion; a primary jet discharge directed rearwardly and oppositely to the direction of normal travel propulsion; a secondary air intake directed vertically of the normal direction of travel propulsion and receptive to air from vertically upwardly; a secondary jet discharge directed substantially vertically of the direction of normal travel propulsion and enabled to discharge gases substantially vertically downwardly of the direction of normal travel propulsion; a mono-valve operative between said primary air intake and secondary air intake and said air compressor to alternatively permit air flow by either said primary air intake or said secondary air intake to said air compressor; a mono-valve operative between said primary jet discharge and said secondary jet discharge and the discharge from said turbine to alternatively permit discharge flow from said turbine by either said primary jet discharge or said secondary jet discharge.

2. The device as defined in claim 1 and: the first named mono-valve having an axis of oscillation disposed horizontally and transversely of the direction of normal travel propulsion and including a radially outward valve wall which is part of the cylindrical form about said axis; the second named mono-valve having an axis of oscillation disposed horizontally and transversely of the direction of normal travel propulsion and including a radially outward valve wall which is part of the cylindrical form about said axis; actuation control means for each said mono-valve to selectively procure intake by either said air intake and to selectively procure discharge by either said jet discharge.

3. A turbine propulsion means comprising: a rotary air compressor, a combustion chamber receiving air under pressure from the compressor, a fuel supply to the combustion chamber, a turbine receiving gaseous products and air from the combustion chamber and compressor, a driving connection between the turbine and the rotary air compressor; an air intake by which the air compressor receives air from ambient air for compression; a primary jet discharge directed rearwardly and oppositely to the direction of normal travel propulsion; a secondary jet discharge directed substantially vertically of the direction of normal travel propulsion and enabled to discharge gases substantially vertically downwardly of the direction of normal travel propulsion; a valve means operative between said primary jet discharge and said secondary jet discharge and the discharge from said turbine to alternatively permit discharge flow from said turbine by either said primary jet discharge or said secondary jet discharge; the said valve means being a mono-valve mounted to be rotatable about an horizontal axis which is transversely of and substantially at right angles to the longitudinal axis of the primary jet discharge and formed so that in one position the mono-valve obstructs discharge through the primary jet discharge and simultaneously permits discharge through said secondary jet discharge and so that in an alternative position the mono-valve permits discharge through said primary jet discharge and simultaneously obstructs discharge through said secondary jet discharge.

4. The device as defined in claim 3 and: the said secondary jet discharge being elongated in the direction of normal travel propulsion and having a plural number of airfoils spaced in the direction of normal travel propulsion and transversely of said jet discharge and directing flow generally downwardly and providing upward sustentation support; the said secondary jet discharge and said compressor and turbine being mounted in a unitary casing structure wherein said elongated secondary jet discharge and airfoils are formed to be substantially in the unitary casing structure and extended below the compressor and turbine structure and substantially parallel to the axis of the compressor and turbine structure.

5. The device as defined in claim 3 and: a secondary rotary air propellor means driven by said turbine, means by which the secondary rotary air propellor means may receive air from said air intake; means by which the secondary rotary air propellor means may discharge air as directed by said mono-valve to either said primary jet discharge or said secondary jet discharge with the discharge flow from said turbine.

6. A turbine propulsion means comprising: a rotary air compressor means, a combustion chamber means receiving air under pressure from the air compressor, a fuel supply to the combustion chamber means, a turbine receiving gaseous products and air from the combustion chamber means and compressor means, a driving connection between the turbine and the air compressor means; air intake means by which the air compressor means receives air from ambient air for compression; a primary jet discharge directed rearwardly and oppositely to the direction of normal travel propulsion; a secondary jet discharge directed substantially vertically of the direction of normal travel propulsion and enabled to discharge gases substantially vertically downwardly of the direction of normal travel propulsion; a mono-vale having an axis of oscillation disposed horizontally and transversely of the direction of normal travel propulsion and including a radially outward valve wall which is part of the cylindrical form about said axis, an actuation control means for said mono-valve to position the valve wall alternatively to block discharge flow to the secondary jet discharge and simultaneously to permit flow through said primary jet discharge, or in the alternative phase to block discharge flow to said primary jet discharge and direct discharge flow into the secondary jet discharge.

7. A turbine propulsion means comprising: a rotary air compressor means, a combustion chamber means receiving air under pressure from the air compressor means, a fuel supply to the combustion chamber means, a turbine receiving gaseous products and air from the combustion chamber means and air compressor means, a driving connection between the turbine and the air compressor means; air intake means by which the air compressor means receives air from ambient air for compression; a primary jet discharge directed rearwardly and oppositely to the direction of normal travel propulsion; a secondary jet discharge directed substantially vertically of the direction of normal travel propulsion and enabled to discharge gases substantially vertically downwardly of the direction of normal travel propulsion; a valve means having an axis of oscillation disposed horizontally and transversely of the direction of normal travel propulsion and including a radially outward valve wall which is part of the cylindrical form about said axis, an actuation control means for said valve means to position the valve wall alternatively to block discharge flow to the secondary jet discharge and simultaneously to permit flow through said primary jet discharge, or in the alternative phase to block discharge flow to said primary jet discharge and direct discharge flow into the secondary jet discharge; the said secondary jet discharge having ejection nozzle means elongated in the direction of normal travel propulsion; hydrofoil means substantially in the plane of said ejection nozzle means and extending forwardly and rearwardly from said ejection nozzle means, the said hydrofoil means and ejection nozzle means having an inclination in the plane of the direction of normal travel propulsion to form hydrofoil sustentation on water for a craft on which all said means is carried.

8. The device as defined in claim 7 and: a secondary air propulsion means driven by said turbine and receiving air from the air intake means, the last named air propulsion means having conduit discharge with said primary discharge to provide flow with flow from said turbine and alternatively by either said primary jet discharge or the secondary jet discharge as directed by said valve means.

9. The device as defined in claim 7 and: the said hydrofoil means including surfaces laterally horizontally of the ejection nozzle means and in the plane of the hydrofoil means.

10. The device as defined in claim 7 and: the said ejection nozzle means and the said hydrofoil means being formed with and substantially fixed with said turbine propulsion means and as a unit therewith.

11. A turbine propulsion means comprising: a rotary air compressor, a combustion chamber receiving air under pressure from the air compressor, a fuel supply to the combustion chamber, a turbine receiving gaseous products and air from the combustion chamber and air compressor, a driving connection between the turbine and the air compressor; air intake means by which the air compressor receives air from ambient air for compression; a primary jet discharge directed rearwardly and oppositely to the direction of normal travel propulsion; a secondary jet discharge directed substantially vertically of the direction of normal travel propulsion and enabled to discharge gases substantially vertically downwardly of the direction of normal travel propulsion; valve means operative between said primary jet discharge and said secondary jet discharge and the discharge from said turbine to alternatively permit discharge flow from said turbine by either said primary jet discharge or said secondary jet discharge; the said secondary jet discharge being elongated in the direction of normal travel propulsion and having formed substantially in the plane of the discharge therefrom hydrofoil plane means having an inclination vertically to the plane of travel propulsion to form hydrofoil sustentation on water for a craft on which all said means is carried.

12. A turbine propulsion means comprising: a rotary air compressor, a rotary turbine driving the air compressor; a primary air intake directed fowardly and in the direction of normal travel propulsion; a primary jet discharge directed rearwardly and oppositely to the direction of normal travel propulsion; a secondary air intake directed vertically of the normal direction of travel propulsion and receptive to air from vertically upwardly; a secondary jet discharge directed substantially vertically of the direction of normal travel propulsion and enabled to discharge gases substantially vertically downwardly of the direction of normal travel propulsion; a valve means operative between said primary air intake and secondary air intake and said air compressor to alternatively permit air flow by either said primary air intake or said secondary air intake to said air compressor; a valve means operative between said primary jet discharge and said secondary jet discharge and the discharge from said turbine to alternatively permit discharge flow from said turbine by either said primary jet discharge or said secondary jet discharge; the said secondary jet discharge being elongated in the direction of normal travel propulsion and having formed laterally of said secondary jet discharge surfaces substantially right angled to said jet discharge and the last named surfaces having an inclination in the plane of the direction of normal travel propulsion to form hydrofoil sustentation on water for a craft on which said means is carried.

References Cited in the file of this patent

UNITED STATES PATENTS

| | | |
|---|---|---|
| 1,585,281 | Craddock | May 18, 1926 |
| 2,444,318 | Warner | June 29, 1948 |
| 2,849,861 | Gardiner | Sept. 2, 1958 |
| 2,968,452 | Cook | Jan. 17, 1961 |
| 2,973,921 | Price | Mar. 7, 1961 |